Sept. 22, 1953  J. L. HUGHES ET AL  2,652,675
GRAIN CUTTING AND WINDROW FORMING IMPLEMENT
Filed Aug. 15, 1950  4 Sheets-Sheet 4
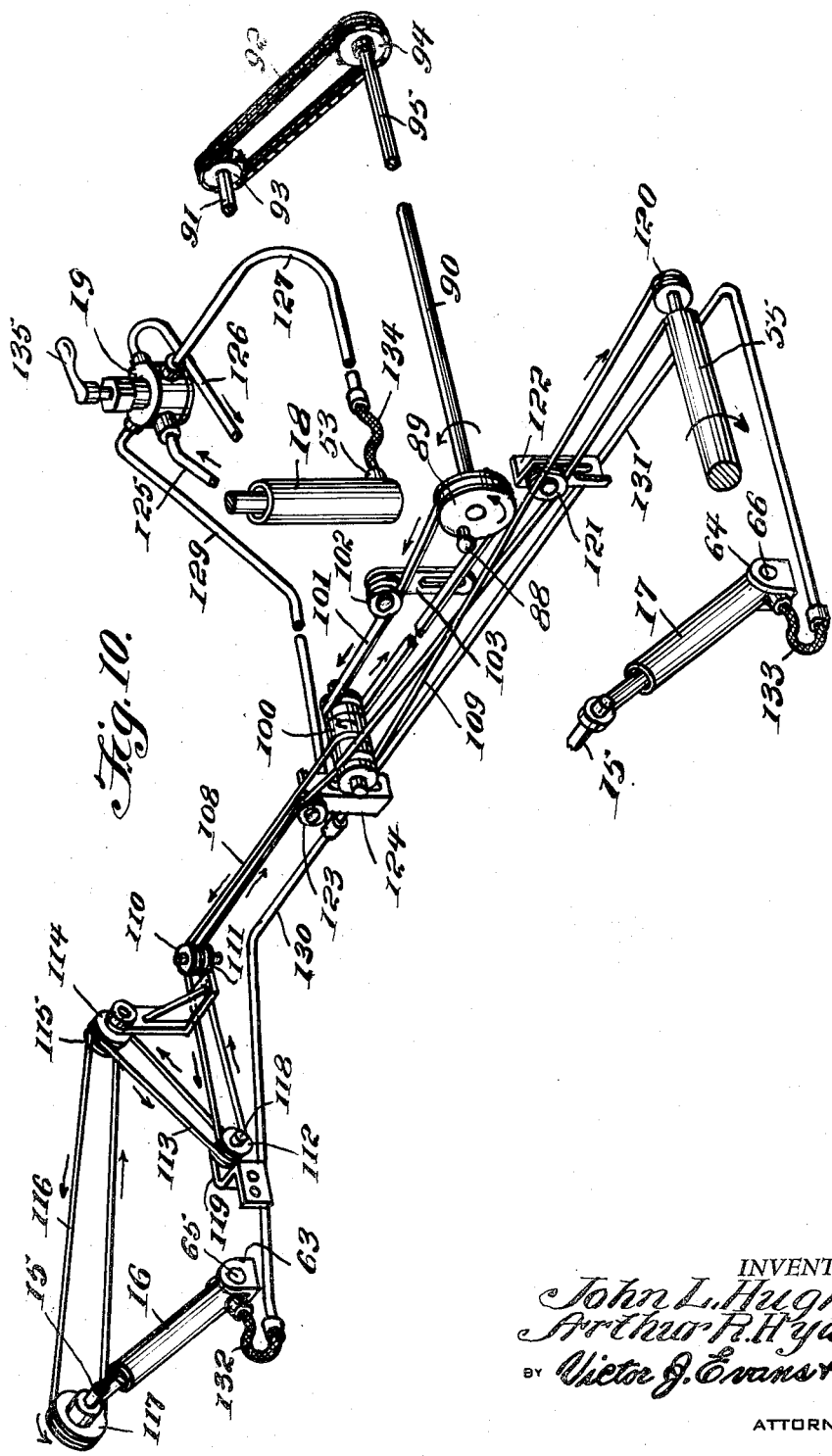
INVENTOR.
John L. Hughes,
Arthur R. Hyatt,
BY Victor J. Evans & Co.
ATTORNEYS Patented Sept. 22, 1953

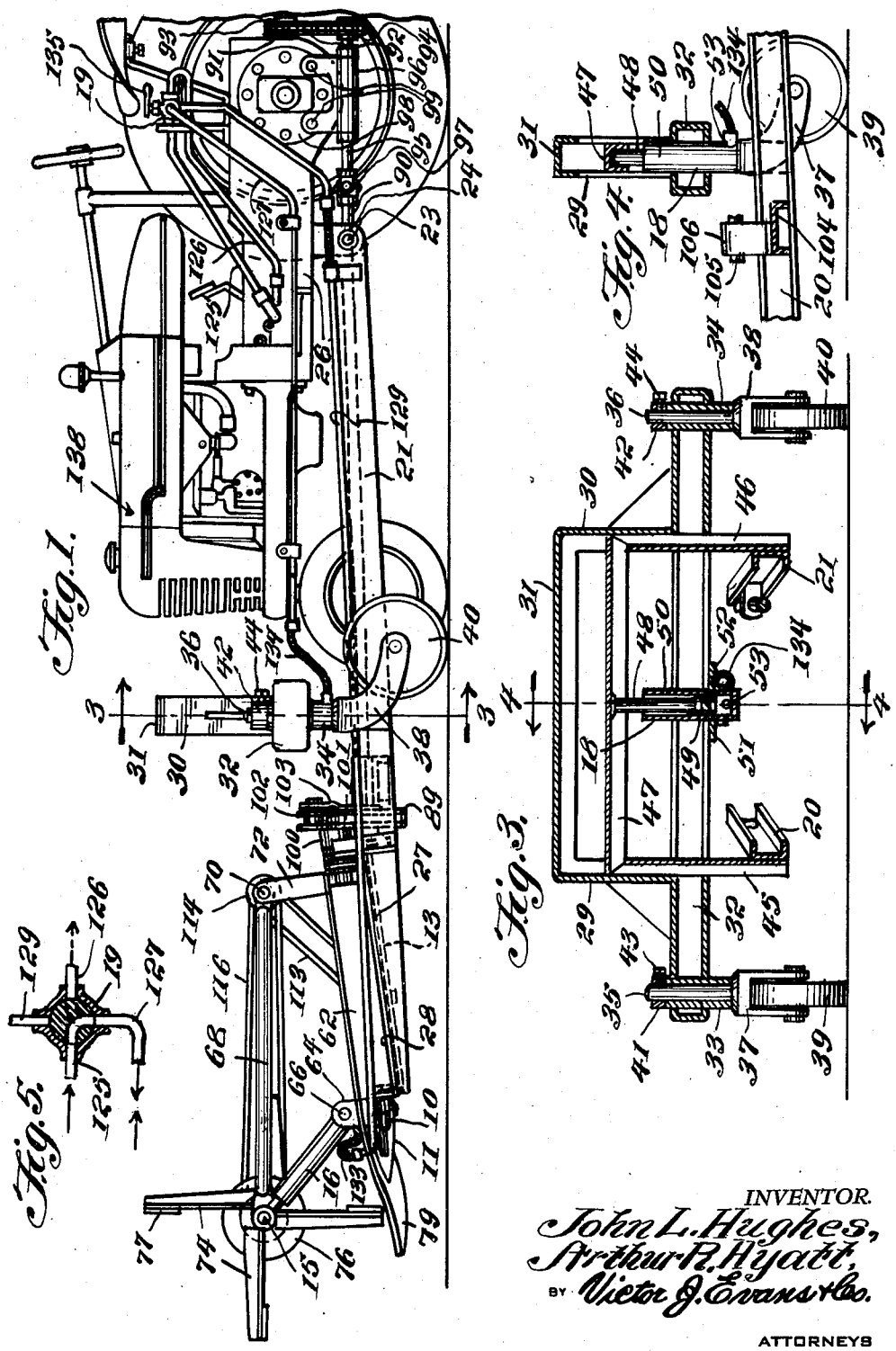

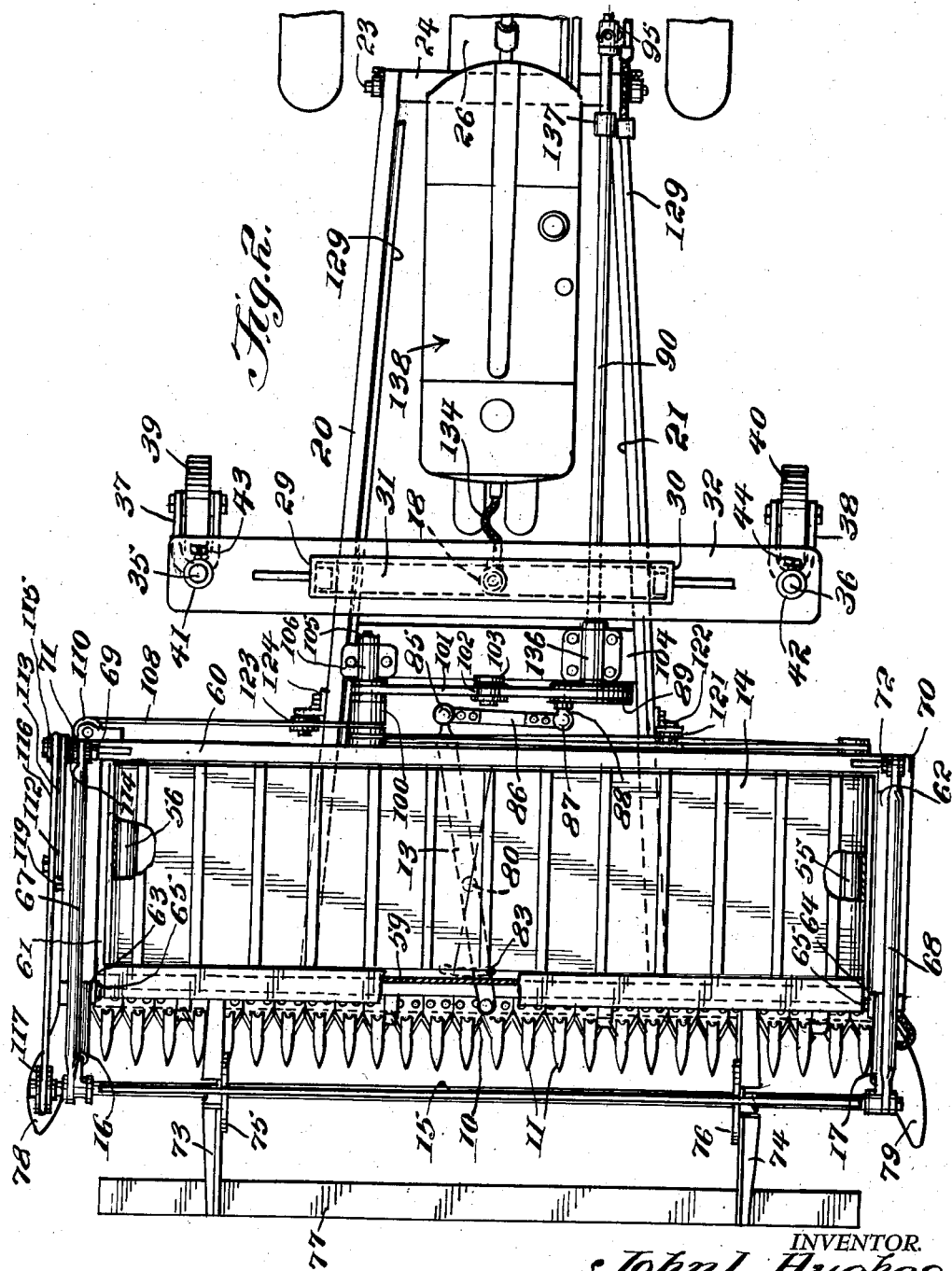

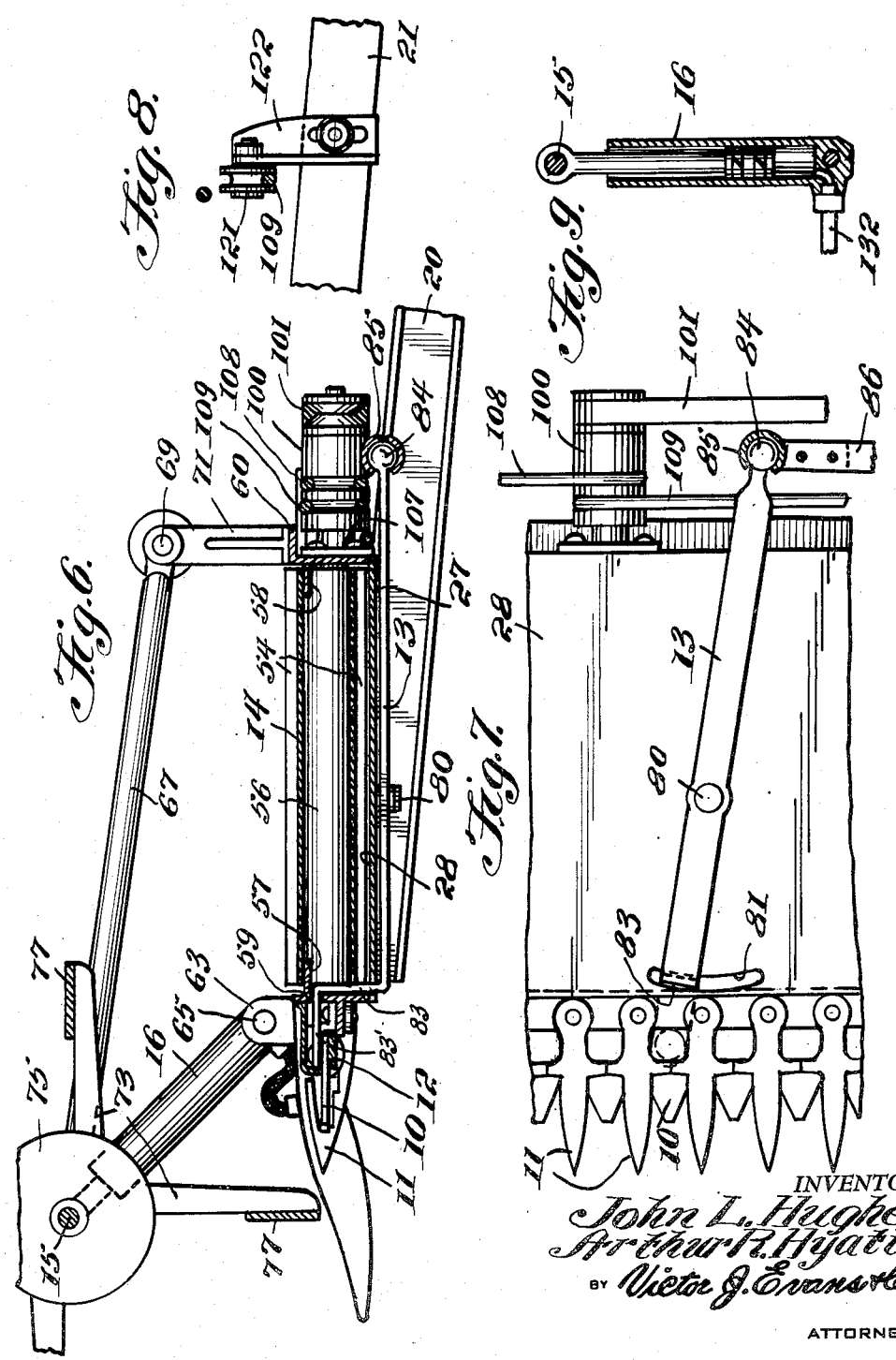

2,652,675

UNITED STATES PATENT OFFICE 2,652,675

GRAIN CUTTING AND WINDROW FORMING IMPLEMENT

John L. Hughes and Arthur R. Hyatt, Blandinsville, Ill.

Application August 15, 1950, Serial No. 179,612

3 Claims. (Cl. 56—23)

This invention relates to grain harvesting machinery, and in particular a tractor actuated mower for cutting small grain and depositing the grain in a windrow at one end of the cutter bar.

The purpose of this invention is to provide means for recovering small grain with as little waste as possible and wherein a wide swath of grain is conveyed to one side to form a comparatively small windrow.

In some sections of the country and particularly in dry weather ripened grain is comparatively short and when the short grain is dropped behind a sickle bar it is difficult to recover the grain from the stubble. With this thought in mind this invention contemplates a sickle or cutter bar having a conveyor in combination therewith with the conveyor positioned to receive grain cut by the sickle bar and actuated to deposit the grain in windrows at the end of the bar.

The object of this invention is, therefore, to provide a laterally operating conveyor in combination with a cutter bar wherein short grain cut by the cutter bar is piled in a single windrow formed at the end of the cutter bar with each swath.

Another object of the invention is to provide an improved harvester for short grain that is constructed to be carried on the forward end of a tractor.

A further object of the invention is to provide a cutter bar and windrow forming conveyor for recovering short grain, which is of a simple and economical construction.

With these and other objects and advantages in view the invention embodies an elongated horizontally disposed cutter bar having a conveyor positioned to follow the cutter bar, a reel adjustably mounted above the cutter bar, means for adjusting the elevation of the cutter bar and conveyor, and means attaching the parts to the forward end of a tractor.

Other features and advantages of the invention will appear from the following description taken in connection with the drawings wherein:

Figure 1 is a side elevational view illustrating the combined cutter bar and windrow former suspended from the forward end of a tractor.

Figure 2 is a plan view illustrating the implements with part broken away showing the knife bar reciprocating element.

Figure 3 is a cross section through the mounting elements taken on line 3—3 of Figure 1.

Figure 4 is a longitudinal section through the mounting elements shown in Figure 3 being taken on line 4—4 thereof.

Figure 5 is an enlarged view with parts broken away and shown in section illustrating a four-way valve for controlling fluid under pressure to the reel control cylinder and cylinder for adjusting the elevation of the cutter bar and conveyor.

Figure 6 is an enlarged central longitudinal section through the mounting elements of the tail pulley of the conveyor with parts shown in elevation and parts broken away.

Figure 7 is an enlarged fragmentary bottom plan view of the under side of the cutter bar and conveyor frame illustrating the rocker arm for actuating the knives of the cutter bar with a reciprocating movement.

Figure 8 is an enlarged detail illustrating a take-up pulley for taking up slack in the operating belts of the implement.

Figure 9 is an enlarged detail showing a longitudinal section through one of the cylinders for adjusting the elevation of the reel.

Figure 10 is a diagrammatic view illustrating the relative positions of the pressure fluid lines and transmission elements.

Referring now to the drawings wherein like reference characters denote corresponding parts the improved short grain harvester of this invention includes a cutter bar 10 having guards 11 thereon, a knife bar 12 reciprocated over the cutter bar by a rocker arm 13, a conveyor belt 14, a reel having a shaft 15, hydraulic cylinders 16 and 17 for adjusting the elevation of the reel, a similar cylinder 18 for adjusting the elevation of the implement and a four-way control valve 19.

In the design shown the implement frame is formed by longitudinally disposed side beams 20 and 21 pivotally mounted by a shaft 23 in a hanger 24 from the tractor body 26, at the inner ends, and the outer ends of the beams are provided with sloping upper surfaces, as indicated by the numeral 27 upon which the lower plate or pan 28 of the conveyor is positioned, as illustrated in Figure 6.

The outer ends of the side beams 20 and 21 are suspended in a truck having an intermediate inverted U-shape section formed with vertically disposed arms 29 and 30 connected by a horizontally disposed bar 31. The lower ends of the arms 29 and 30 are mounted in a beam 32 having vertically disposed bearings 33 and 34 in which pins 35 and 36, respectively, of caster yokes 37 and 38 are pivotally mounted. The yokes are provided with rollers 39 and 40 and set collars 41 and 42 are secured on the upper ends of the pins 35 and 36 by set screws 43 and 44.

A U-shaped yoke having legs 45 and 46 extends upwardly from the side beams 20 and 21 and the upper ends of the legs are connected by a cross beam 47 which is provided with a depending piston rod 48 having a piston 49 on the lower end and, as illustrated in Figure 3, the piston is positioned in a cylinder 50.

The cylinder 50 is supported from the beam 32 by angles 51 and 52 and the lower end of the cylinder is provided with an intake connection 53.

With the legs 45 and 46 slidably mounted in the arms 29 and 30, respectively, fluid pressure applied through the connection 53 to the lower end of the cylinder 50 forces the piston 49 and the member 47 of the yoke upwardly thereby adjusting the elevation of the side beams 20 and 21 and the cutter bar carried by the outer ends thereof.

The conveyor belt or apron 14, which may be formed of canvas with spaced ribs 54 thereon, is mounted on a head pulley 55 and a tail pulley 56 with the upper edges of the belt sliding over supporting flanges 57 and 58 and with the slats or ribs riding upon the pan 28 on the return side of the belt.

The conveyor pulleys are mounted in side beams 59 and 60 and the beams are connected at the ends by studs 61 and 62. The beams 59 and 60 are carried on the outer ends of the side beams 20 and 21 and the reel is suspended by the hydraulic cylinders 16 and 17 with the lower ends of the cylinders pivotally mounted in bearings 63 and 64 by pins 65 and 66. The reel is supported in an outwardly extended position by links 67 and 68 which are pivotally mounted by bolts 69 and 70 in the upper ends of bearings 71 and 72 which are mounted on the beam 60 of the conveyor frame.

The reel is formed with radially disposed arms 73 and 74 which extend outwardly from flanges 75 and 76 that are mounted on the shaft 15 with slats or strips 77 carried by the outer ends of the arms.

The ends of the cutter bar are provided with shoes 78 and 79 and the conventional type of guards and blades or knives are mounted in mowing positions with the knife bar reciprocated by the rocker arm 13 and the rocker arm is pivotally mounted on a bolt 80 on the under side of the pan 28. The outer end of the rocker arm 13 extends upwardly through a slot 81 with a vertically disposed section 83 thereof connected to the knife bar by an extended end 83'.

The inner end of the rocker arm 13 is provided with a ball 84 that is positioned in a socket 85 of a pitman 86, a socket 87 on the opposite end of which is positioned on a ball 88 which is eccentrically mounted on a pulley 89.

The pulley 89 is mounted on the end of a shaft 90 and the shaft is driven from the power take off 91 of the tractor by a chain 92 trained over sprockets 93 and 94, the sprocket 94 being mounted on a stub shaft 95 in a bearing 96 and connected to the shaft 90 by universal joints 97. The bearing 96 is attached to a flange 98 of the rear axle housing of the tractor by bolts 99.

The pulley 89 drives a multiple pulley 100 by a belt 101 with a take up idler 102 carried by a bracket 103 positioned to maintain tension in the belt 101. The bracket 103 is adjustably mounted on a bar 104 extended between the side beams 20 and 21, as shown in Figure 2.

The pulley 100 is mounted on a shaft 105 mounted in bearings 106 and 107 and the pulley is also provided with belts 108 and 109 which drive the reel and conveyor, respectively. The belt 108 extends around vertically disposed pulleys 110 and 111 and the opposite end is trained over a pulley 112 which is also provided with a belt 113 that drives pulleys 114 and 115 on the shaft 69 in the upper end of the bearing bracket 71.

A belt 116 is trained over the pulley 115 and also over a pulley 117 on the end of the shaft 15 of the reel whereby the reel is rotated from the power take off through the shaft 90 and multiple pulley 100, as illustrated in Figure 10. The pulley 112 is mounted on a shaft 118 in the bracket 119 that is positioned on the connecting strut or beam 61 at the end of the conveyor frame.

The belt 109, which is crossed, drives the head pulley 55 of the conveyor through a pulley 120 and slack in the belt is taken up by a take up idler 121 adjustably mounted on the frame through a bracket 122. A similar take up idler 123, over which the belt 108 passes, is adjustably mounted on the conveyor frame through a bracket 124.

Fluid under pressure of the tractor is supplied through the valve 19 through a pipe 125 and is returned to the tractor from the valve by a pipe 126. The valve 19 is connected with the cylinder 18 by element 127 and with the cylinders 16 and 17 by elements 129, 130 and 131, said elements 130 and 131 being secured to the respective cylinders 16 and 17 by connections 132 and 133. A similar hose connection 134 is provided in the tube or connection 127. The valve is provided with a handle 135 and, as illustrated in Figure 5, the valve may be turned to supply fluid under pressure to the reel elevating cylinders 16 and 17 or to the truck elevating cylinder 18.

A bearing 136 is provided on the cross bar 104 for journaling the outer end of the shaft 90 and a similar bearing 137 is provided on the inner surface of the side beam 21, as shown in Figure 2.

With the parts arranged in this manner the cutter bar and conveyor are suspended from the forward end of a tractor as indicated by the numeral 138 and as the implement is operated short grain cut by the cutter bar drops upon the apron 14 and is carried to the side being deposited in a windrow at the end of the conveyor. By this means short grain of a comparatively wide swath is piled or accumulated in a comparatively small windrow so that the grain may readily be recovered.

It will be understood that modifications may be made in the design and arrangement of the parts without departing from the spirit of the invention.

What is claimed is:

1. In an agricultural implement, the combination which comprises a horizontally disposed rectangular shaped frame, a cutter bar mounted on the forward edge of the frame, a conveyor having an apron trained over pulleys journaled in the frame and positioned to receive grain cut by the cutter bar, said conveyor positioned to convey grain cut by the cutter bar to one side of the implement for forming a windrow at the end of the cutter bar, a plurality of side beams positioned to be mounted on opposite sides of a tractor on the outer ends of which the said cutter bar and frame are carried, a reel journaled on the leading edge of the frame and positioned above the cutter bar, bearings extended upwardly from the trailing edge of the frame, links positioned at the ends of the frame, pivotally mounted in the upper ends of said bearings and pivotally connected to the reel providing a vertically swinging mounting for the reel, a truck mounted on wheels and having an inverted U-shape section therein through which the said side beams extend, hydraulic cylinders providing elevating means in the truck for adjusting the elevation of the frame and cutter bar, and means for reciprocating the cutter bar, actuating the conveyor and rotating the reel from the power take off of the tractor.

2. In an agricultural implement, the combination which comprises a horizontally disposed rectangular shaped frame, a cutter bar mounted on the forward edge of the frame, a conveyor having an apron trained over pulleys journaled in the frame and positioned to receive grain cut by the cutter bar, said conveyor positioned to convey grain cut by the cutter bar to one side of the implement for forming a windrow at the end of the cutter bar, side beams positioned to be mounted on opposite sides of a tractor on the outer ends of which the said cutter bar and frame are carried, a reel journaled on said frame and positioned above the cutter bar, a truck mounted on wheels and having an inverted U-shape section therein through which the said side beams extend, elevating means in the truck for adjusting the elevation of the frame and cutter bar, means for reciprocating the cutter bar, actuating the conveyor and rotating the reel from the power take off of the tractor, and means adjusting the elevation of the reel in relation to the cutter bar from the tractor.

3. In an agricultural implement, the combination which comprises a horizontally disposed rectangular shaped frame, a cutter bar carried by the outer edge of the frame, a reel on the leading edge of the frame and positioned above the cutter bar, spaced hydraulic cylinders pivotally mounted on the frame and having connecting rods in the outer ends of which the reel is journaled, links connecting the reel with bearing elements positioned on the trailing edge of the frame, a conveyor having head and tail pulleys journaled in the frame and positioned to receive grain cut by the cutter bar whereby grain is carried to one side of the implement and deposited to form a windrow, substantially parallel side beams positioned to extend on opposite sides of a tractor and on the outer ends of which the cutter bar and frame are carried, a truck mounted on wheels and having an inverted U-shape section in the intermediate part thereof through which the side beams extend, a hydraulic cylinder in the truck for elevating the side beams to adjust the position of the cutter bar and conveyor, means actuating the hydraulic cylinders of the truck and reel from a tractor, and means operating the cutter bar, conveyor and reel from a tractor.

JOHN L. HUGHES.
ARTHUR R. HYATT.

References Cited in the file of this patent
UNITED STATES PATENTS

| Number | Name | Date |
|---|---|---|
| 1,278,102 | Burgess | Sept. 10, 1918 |
| 2,244,857 | Sletten | June 10, 1941 |
| 2,395,672 | Kranick | Feb. 26, 1946 |
| 2,492,223 | Jenson | Dec. 27, 1949 |
| 2,501,424 | Ufer | Mar. 21, 1950 |
| 2,513,906 | Acton | July 4, 1950 |